United States Patent [19]

Newman

[11] Patent Number: 5,013,165
[45] Date of Patent: May 7, 1991

[54] SELF-ACTING AIR SUPPORTED THRUST BEARING

[75] Inventor: Paul Newman, Bristol, England
[73] Assignee: Rolls-Royce plc, England
[21] Appl. No.: 559,051
[22] Filed: Jul. 30, 1990

[30] Foreign Application Priority Data

Aug. 25, 1989 [GB] United Kingdom ............... 8919319

[51] Int. Cl.⁵ .............................................. F16C 32/00
[52] U.S. Cl. ................................................. 384/122
[58] Field of Search ............... 384/122, 121, 124, 112, 384/107, 309

[56] References Cited

U.S. PATENT DOCUMENTS 4,403,873  9/1983  Gardner .............................. 384/122
4,618,270 10/1986  Kraus .................................. 384/121
4,699,525 10/1987  Mizobuchi et al. ................. 384/122
4,738,550  4/1988  Gardner .............................. 384/122

Primary Examiner—Lenard A. Footland
Attorney, Agent, or Firm—Oliff & Berridge

[57] ABSTRACT

A self acting air supported thrust bearing is formed viscokinetically between a static segmented thrust pad and a rotor connected to a shaft by a flexible link which allows the rotor to rotate about its own center of gravity. Thrust is transferred from the shaft to the rotor by a thrust disc acting as a diaphragm.

As a result distortion of the rotor due to centrifugal and thrust forces which would cause the bearing to fail is reduced.

7 Claims, 2 Drawing Sheets

SELF-ACTING AIR SUPPORTED THRUST BEARING

FIELD OF INVENTION

This invention relates to self acting air supported thrust bearings.

DESCRIPTION OF THE PRIOR ART

A self acting air supported bearing is shown, in part, in FIG. 1. A member 1 is in rapid motion in the direction of the arrow 2 relative to an adjacent second member 3. The two members 1 and 3 are arranged to that the gap 4 between them narrows in the direction of the motion of member 1.

As the first member 1 moves, air adjacent to the member 1 is entrained by the member 1 due to the air's viscosity and moves in the same direction as the member 1. This entrained air passes into the wider end 5 of the gap 4 between the two members. As the entrained air passes along the gap 4 the gap 4 narrows and as a result the entrained air is compressed. The two members 1 and 3 are then urged apart by the force exerted on them by the pressure of the compressed air in the gap 4.

Thus the relative movement of the members generates a layer of compressed air between them which urges them apart. This method of pressure generation is known as viscokinetic pressure generation.

Bearings of this type have very low friction, and because they employ no lubricants or moving parts in contact they can operate at very high temperatures.

As yet it has not been feasible to employ this type of air supported bearing as a thrust bearing. That is a bearing for applying a thrust acting on a first member to a second member, the two members rotating relative to one another about an axis parallel to the thrust direction. This is because some parts of a thrust bearing must rotate and this rotation causes distortion of the rotating parts due to centrifugal forces. The bearing parts are also distorted by the loads produced by the thrust carried by the bearing. These distortions disrupt the thin film of air supporting the bearing and so cause the bearing to fail.

This invention was intended to produce a bearing overcoming this problem, at least in part.

BRIEF SUMMARY OF THE INVENTION

This invention provides a self acting gas supported thrust bearing comprising; a static thrust pad, a shaft rotating about an axis and carrying a thrust parallel to the axis, a rotor connected to the shaft by a flexible link; the flexible link being arranged to drive the rotor at the same rotational velocity as the shaft and to allow the rotor to move radially and axially relative to the shaft, and a thrust element acting to transfer the thrust from the shaft to the rotor, the rotor and thrust pad co-operating to produce a pressurised layer of gas between them by the viscokinetic effect and to use this pressurised gas layer to generate a reaction force to the thrust.

This arrangement reduces the degree of distortion induced in the rotor due to centrifugal effects.

Preferably a plurality of pins are rigidly fixed to the shaft parallel to the shaft axis, each pin passing through a hole in the rotor and the holes being wider than the pins, because this arrangement allows the rotor to be driven at the same rotational speed as the shaft without transmitting the thrust on the shaft to the rotor or constraining the rotor to rotate about the shaft axis, both of which would cause distortion of the rotor.

BRIEF DESCRIPTION OF THE DRAWINGS

A bearing embodying the invention will now be described by way of example only with reference to the accompanying drawings in which;

FIG. 3 shows a cross section along the line x—x of FIG. 2; an

DETAILED DESCRIPTION

Figure 1:
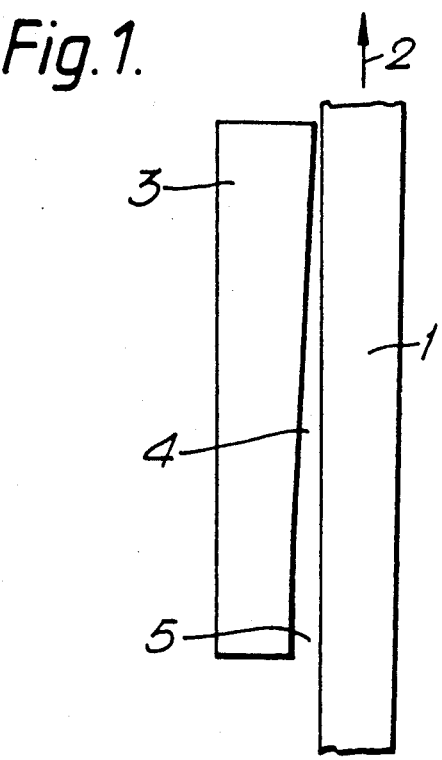
FIG. 1 shows a self acting air supported bearing, in part.
Figure 2:
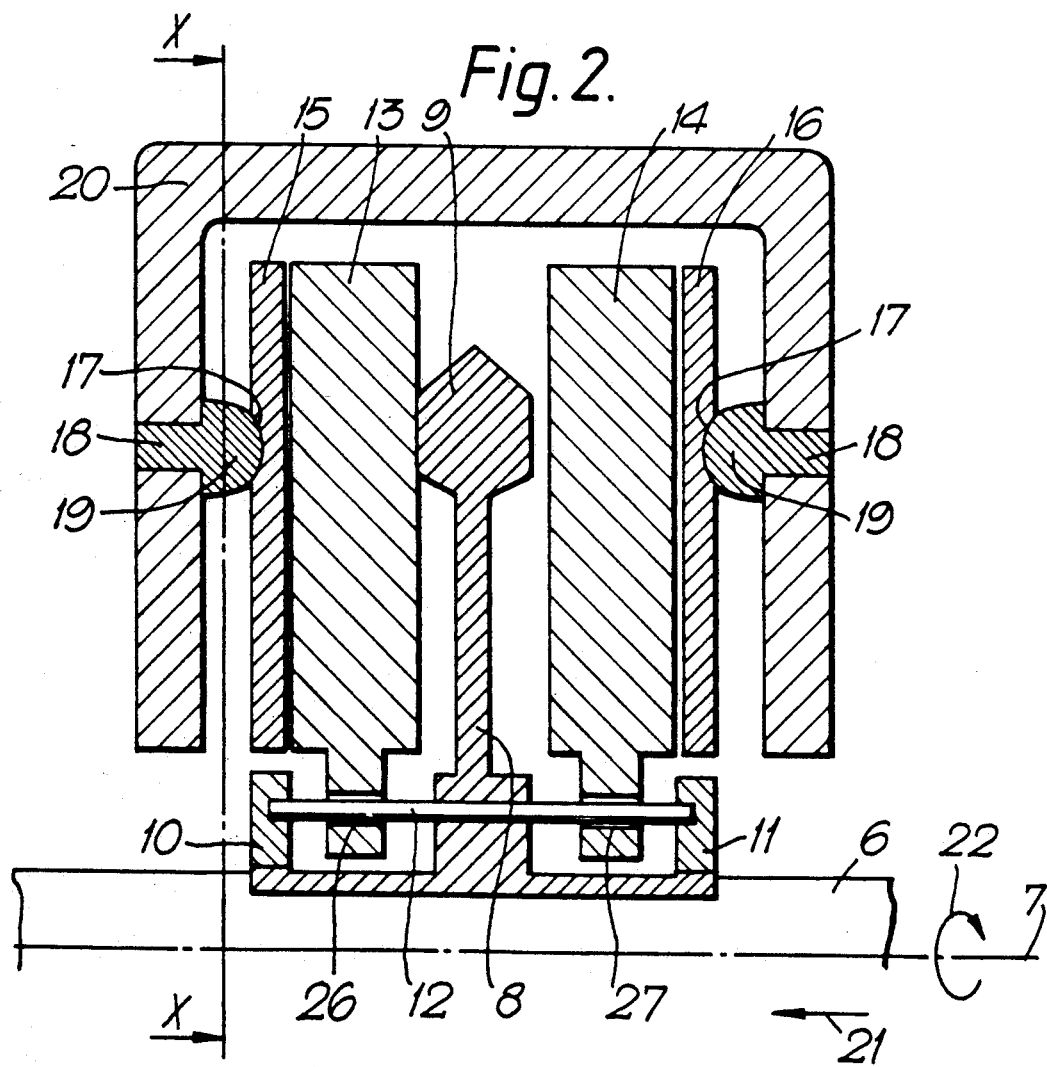
FIG. 2 shows a thrust bearing employing the invention in cross section along its rotational axis.
Figure 3:
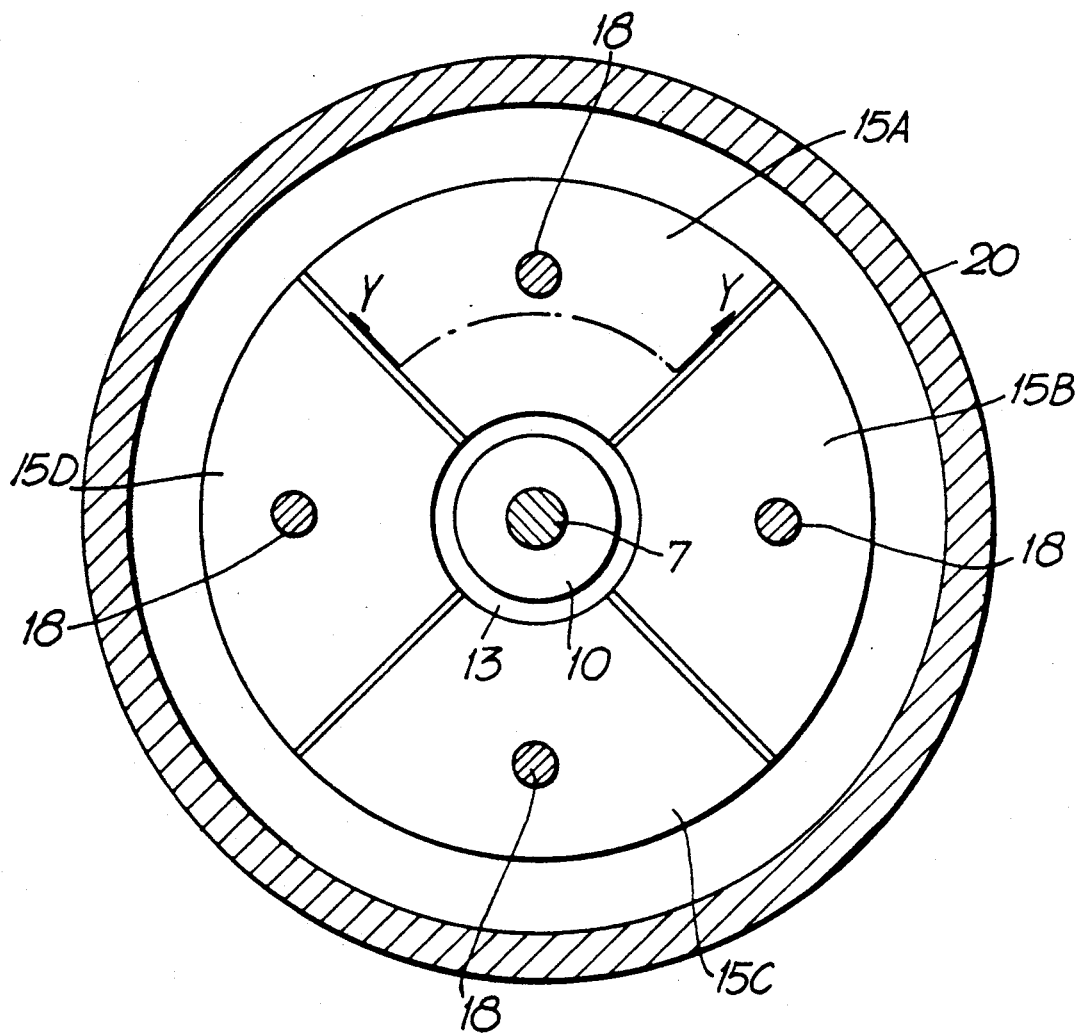

Referring to FIGS. 2 and 3 a self acting air supported thrust bearing is formed by a shaft 6, which can rotate about its axis 7. For clarity only the half of the bearing on one side of the axis 7 is shown, the bearing as a whole is symmetrical about the axis 7.

The shaft 6 can apply a thrust in either direction along the axis 7.

A thrust disc 8 having a thickened circumferential section 9 bearing a plurality of radial splines on each side is secured to the shaft 6. A pair of flanges 10 and 11 are also secured to the shaft 6 on either side of the thrust disc 8. The flanges 10 and 11 and thrust disc 8 support a pin 12. There are four such pins disposed symmetrically about the shaft 6. Two bearing rotors 13 and 14 each formed by a parallel sided circular annulus on either side of and adjacent to the thrust disc 8 are supported on the pins 12. The rotors 13 and 14 are loosely supported by the pins 12 by each of the pins 12 passing through a respective hole 26 and 27 in each of the rotors 13 and 14. The holes 26 and 27 have a larger diameter than the pins 12 so that the rotors 26 and 27 have a considerable amount of play both parallel and perpendicular to the axis 7 so that they are driven round the axis 7 by the pins 12 when the shaft 6 rotates but are free to find their own position axially and radially relative to the shaft 6.

Adjacent to the rotors 13 and 14 are segmented static thrust pads 15 and 16 respectively. Each of the static thrust pads 15 and 16 is formed by four separate segments, 15A, 15B, 15C, 15D in the case of thrust pad 15. Each of the segments which make up one of the thrust pads 15 and 16 is a quarter of a full circle and is supported by a bearing surface allowing the segment to rotate about all three axes and formed by a spherical indentation 17 formed in the segment co-operating with a peg 18 having a hemispherical head 19 within the spherical indentation 17. The indentation 17 is formed at the same radial position relative to the axis 7 on all of the segments making up the thrust pads 15 and 16. The pegs 18 are secured in a static bearing shell 20 which is secured to a structure (not shown) to which the thrust on the shaft 6 is applied. The pegs 18 are at the same radius relative to the axis 7 as the splined section 9 of the thrust disc 8.

In operation the shaft 6 rotates around the axis 7 in the direction of the arrow 22 and a thrust acts along the shaft 6 in the direction of the arrow 21. As the shaft 6 rotates, the thrust disc 8 rotates with it and the rotors 13 and 14 are driven round by the pins 12 at the same angular velocity as the shaft 6.

The rotors 13 and 14 are only loosely supported by the pins 12 and as a result the rotors 13 and 14 are free to rotate about their respective centres of gravity and are not constrained to rotate about the geometric centre of the shaft 6, as would be the case if they were rigidly linked to the pins 12. As a result the rotors 13 and 14 do not suffer centrifugal distortion.

The thrust on the shaft 6 causes the shaft 6 to move in the direction 21 of the thrust and this brings the splined section 9 of the thrust disc 8 into contact with the rear face of the rotor 13.

Due to rotation there will be relative radial movement of the rotor 13 and the thrust disc 8. This movement is due to the fact that both the rotor 13 and the thrust disc 8 will expand due to centrifugal expansion and that due to differences in their shapes their rates of centrifugal expansion will be different and due to the fact that the rotor 13 will be rotating about its own centre of gravity while the thrust disc 8 will be constrained to rotate about the axis 7 of the shaft 6. The thrust disc 8 is not secured to the rotor 13 so this relative radial movement can be accommodated by the thrust disc 8 sliding radially relative to the rotor 13 without any distorting strains being produced in the rotor 13.

The loose fitting of the rotor 13 to the pins 12 allows the rotor 13 to slide along the shaft 6, as a result all of the thrust on the shaft 6 is transmitted to the rotor 13 via the thrust disc 8 and not from the shaft 6 directly.

The pressure of the compressed air layer formed between each of the segments 15A, 15B, 15C, 15D of the thrust pad 15 and the rotor 13 will vary across the surface of each of the segments 15A, 15B, 15C, 15D.

In theory the pressure should rise steadily as the radial distance from the axis of rotation 7 increases, because the linear velocity of the rotor 13 relative to the thrust pad 15 is equal to the angular velocity of the rotor 13 multiplied by the radial distance from the axis of rotation of the rotor 13 and the pressure generated is dependant on the relative linear velocities of the rotor 13 and thrust pad 15. However the pressure generated also drops off towards the edge of the thrust pad 15 because of escape of the pressurised air from between the thrust pad 15 and the rotor 13. As a result of these two influences the air pressure between the thrust pad 15 and the rotor 13 will vary in a radial direction. Starting at ambient pressure at the radially inner edge of the thrust pad 15 it will increase steadily to a maximum at one particular radius and will then decrease steadily to ambient pressure at the radially outer edge of the thrust disc 15.

Figure 4:
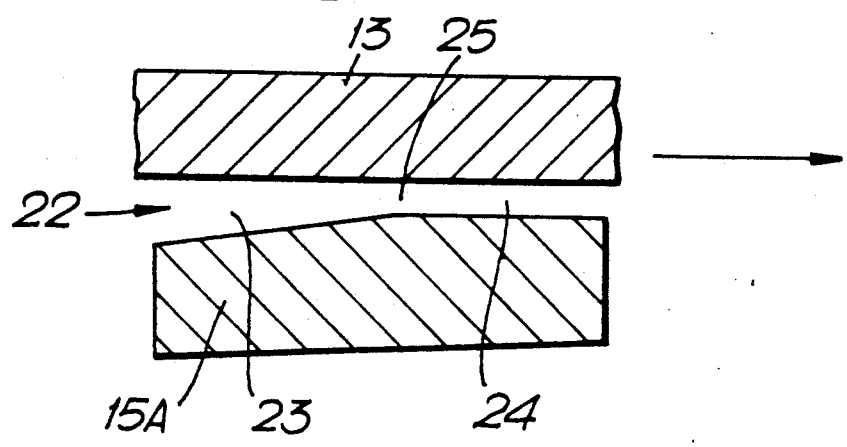
FIG. 4 shows a cross section along the line y—y of FIG. 3; similar parts having identical reference numerals throughout.

The variation in pressure circumferentially is determined by two factors, the first is the leakage of air from the edges of the thrust pad 15 and the second is the profiling of the surface of the pad 15. The profile used is shown in FIG. 4, which is a circumferential cross-section through the thrust pad segment 15A and the portion of the rotor 13 facing it along the line y—y in FIG. 3.

The segment 15A is profiled to provide a gap 22 between it and the rotor 13 having a first tapering section 23 and a second parallel section 24. The rotor 13 moves relative to the segment 15A in the direction of the arrow 26. As a result the air pressure in the gap 22 starts at ambient pressure at the edge of the segment 15A and rises steadily in the tapering region 23 to a peak at a position 25 corresponding to the end of the taper.

The pressure then drops in the parallel region 24 due to air leakage until ambient pressure is reached a the edge of the segment 15A.

Thus the air pressure rises to a maximum and then drops as you cross the segment 15A in either a radial or circumferential direction, as a result there is a single point on the segment 15A where pressure is a maximum, the indentation 17 and pegs 18 are placed at this point. The same effects occur on all of the segments 15A, 15B, 15C, 15D of the thrust pad 15.

Each segment of the thrust pad 15 is supported on a bearing formed by a peg 18 secured to the stationary bearing shell 20. The thrust disc 8 is arranged so that at the operating rotation rate of the bearing centrifugal expansion places the splined section 9 of the thrust disc 8 at the same distance from the axis 7 as the pegs 18. As a result the thrust on the shaft 6 is transmitted through the thrust disc 8, rotor 13 and the thrust pad 15 to the bearing shell 20 without applying any unbalanced couples to the rotor 13. Such couples would distort the rotor 13 and so impede the viscokinetic generation of a pressurised air layer to separate the rotor 13 and thrust pad 15. Thus the thrust acting on the shaft 7 causes little distortion of the rotor 13, it does however cause the thrust disc 8 to distort radially because the thrust disc 8 acts as a diaphragm due to the couple formed by the axial thrust on the shaft 7 and the circumferential reaction force between the rotor 13 and thrust disc 8.

The thrust acting on the shaft 7 urges the rotor 13 towards the thrust pad 15, this is balanced by the air pressure between the rotor 13 and the thrust pad 15 which urges them apart. This produces a non-contacting air supported thrust bearing between the rotor 13 and the thrust pad 15.

If the thrust acting on the shaft 7 increases the rotor 13 will move towards the thrust pad 15. This will increase the ratio of the separations between the rotor 13 and the thrust pad elements 15A and 15D at the widest and narrowest parts of the tapering section 23 and so increase the compression of the entrained air. This increased compression will increase the air pressure force urging the rotor 13 away from the thrust pad 15. Thus as the thrust on the shaft 7 increases the air pressure force automatically increases to balance it.

When the thrust acting on the shaft 7 decreases the rotor 13 is pushed away from the thrust pad 15 by the air pressure force until the separation of the rotor 13 and the thrust pad 15 is large enough that, by the opposite of the process described above, the air pressure force is reduced until it balances the reduced thrust. When a thrust in the opposite direction is applied to the shaft 6 the thrust disc 8 is pulled away from the rotor 13 and is forced against the rotor 14 which is in turn urged towards the thrust pad 16. The process described above then acts to produce a pressurised air layer separating the rotor 14 and thrust pad 16 and balancing the thrust. There is an end float allowed so that when the disc 8 is transmitting thrust to the stationary bearing shell 20 by way of one of the rotors 13 and 14 and one set of thrust pads 15 or 16 there is enough clearance for the unused rotor 13 or 14 to rotate freely without contacting the disc 8 or the unused set of thrust pads 15 or 16.

The thrust pads 15 and 16 are described as having four segments, any number of segments could be used.

The bearing described has been referred to throughout as air supported, any other gas or gasses could of course be substituted.

I claim:

1. A self acting gas supported thrust bearing comprising; a static thrust pad, a shaft rotating about an axis and carrying a thrust parallel to the axis, a rotor connected to the shaft by a flexible link; the flexible link being arranged to drive the rotor at the same rotational velocity as the shaft and to allow the rotor to move radially and axially relative to the shaft, and a thrust element acting to transfer the thrust from the shaft to the rotor, the rotor and thrust pad co-operating to produce a pressurised layer of gas between them by the viscokinetic effect and to use this pressurised gas layer to generate a reaction force to the thrust.

2. A self acting gas supported thrust bearing as claimed in claim 1 in which the flexible link is formed by a plurality of pins rigidly fixed to the shaft and parallel to the shaft axis, each pin passing through a hole in the rotor, the holes being wider than the pins.

3. A self acting gas supported thrust bearing as claimed in claim 1 in which the thrust element is rigidly fixed to the shaft and is in sliding contact with one face of the rotor.

4. A self acting gas supported thrust bearing as claimed in claim 3 in which the thrust element and rotor contact in a circular annulus centred on the axis of the shaft.

5. A self acting gas supported thrust bearing as claimed in claim 1 in which the thrust pad is formed as a plurality of thrust pad segments, each of which co-operates with the rotor to produce a pressurised gas layer between them by the viscokinetic effect.

6. A self acting gas supported thrust bearing as claimed in claim 5 in which each of the thrust pad segments is separately linked to a static bearing shell.

7. A thrust bearing as claimed in claim 4 in which each of the thrust pad segments is linked to a static bearing shell by a link lying within said circular annulus.

* * * * *